United States Patent

[11] 3,604,940

[72] Inventor David R. Matthews
　　　　　　Ann Arbor, Mich.
[21] Appl. No. 847,109
[22] Filed Aug. 4, 1969
[45] Patented Sept. 14, 1971
[73] Assignee Laser Systems Corporation
　　　　　　Ann Arbor, Mich.

[54] RADIANT ENERGY INSPECTION SYSTEM FOR ROTATING OBJECTS
10 Claims, 6 Drawing Figs.

[52] U.S. Cl. .................................................. 250/219 S,
　　　　　　　　　　　　　　　　　　250/222 R, 356/159
[51] Int. Cl. .................................................. G01b 7/12
[50] Field of Search .......................................... 250/222,
　　221, 209, 210, 219 S, 219 WA, 223 B, 219 TH;
　　356/159, 163, 167, 160, 237, 238; 73/462, 466,
　　　　　　　　　　　　　　　　　　　　　467

[56] References Cited
UNITED STATES PATENTS
2,237,811　4/1941　Cockrell ........................ 356/159
2,415,178　2/1947　Hurley, Jr. ..................... 250/222 X
2,524,650　10/1950　Cantle ........................... 250/222 X
2,812,685　11/1957　Vossberg ....................... 356/160
3,141,057　7/1964　Acton ............................ 356/159
3,265,901　8/1966　Schneider ...................... 250/223
3,328,593　6/1967　Johnson et al. ................. 250/219 X Primary Examiner—Walter Stolwein
Attorney—Barnard, McGlynn & Reising ABSTRACT: Radiant energy inspection system for rotating objects including means for directing parallel light beams tangentially along diametrically opposite surface locations of the object, each beam being partially intercepted in accordance with the radial displacements of the object surface relative to the beams. Geometric qualities of the object are determined by producing signals representing the unintercepted beam portions and comparing the signals with one another in a predetermined algebraic frame of reference. Eccentricity is indicated by in-phase signal variations while surface irregularities are indicated by phase shifted signal variations. Diameter is indicated by the algebraic difference between the signals.

PATENTED SEP 14 1971

3,604,940

INVENTOR.
David R. Matthews
BY
Barnard, McGlynn & Reising
ATTORNEYS

3,604,940

RADIANT ENERGY INSPECTION SYSTEM FOR ROTATING OBJECTS

This invention relates to the inspection of rotatable objects using a pair of radiant energy beams which are projected in such manner as to be partially intercepted by the object. More particularly, the invention relates to apparatus for determining and distinguishing between various dimensional characteristics of an object such as size, surface irregularities and eccentricity.

It is often desirable or necessary to determine whether a rotatable object such as a shaft or tool is the proper dimension or is undergoing a dimensional change or surface deformation due to wear or some operation which is being performed on the object. It may be equally desirable or necessary to determine whether the object is rotating about an axis which corresponds to the geometric center of the object or on the other hand is developing an eccentric rotation which might provide destructive to the object or to some associated components such as a bearing. Preferably such determinations are made without removing the object from its normal operating installation and without making physical contact with the object. The prior art teaches several techniques for monitoring surface displacements in an object without making actual contact. For example, capacitor plates may be disposed about an object having a conductive surface to measure surface displacements as a function of capacitive change. This technique is reasonably accurate on parts of larger size but difficulty is often experienced in maintaining a satisfactory signal to noise ratio especially in the inspection of small parts. In addition, this technique requires the object under inspection to be made of a conductive material and to be maintained at some predetermined reference potential.

Various optical techniques are also available but normally require intricate and expensive equipment such as wavelength counters or radiometric receivers. Since most such devices operate on a "head-on" sensing basis where radiation is directed radially toward the object, reasonably high and uniform object reflectivity is required for satisfactory operation and location of radiation sources can be problematical, In accordance with the present invention, dimensional characteristics such as diameter and eccentricity of an object may be determined without physically contacting the object, without particular regard to the conductivity or reflectivity of the object and without requiring the object to be removed from its normal operating installation. In general, this is accomplished by directing a pair of radiant energy beams tangentially along respective surfaces of the object such that a portion of each beam is intercepted by the object, and detecting the relative quantities of radiant energy remaining in the beams.

The present invention also permits such inspection of objects to be accomplished from a considerably distance. Therefore, a single radiant energy source might be used to inspect several objects from a single base location. This is accomplished by the use of highly collimated radiant energy beams which are directed tangentially along the objects and which may be detected with relatively simple and movable detector means.

In addition, the present invention permits a ready distinction between object eccentricity or "wobble" and surface irregularities and other variations in diametric dimensions. In general, this is accomplished by producing and comparing electrical signals representing the location or displacement of diametrically opposite surface portions of the object relative to a reference established by the radiant energy beams.

In a preferred form, the present invention employs at least one pulse-modulated light source to produce at least tow parallel beams of highly collimated light. The pulse modulation minimizes interference from background noise and the light beams may be totally spaced or partially overlapped depending upon the dimensions of the part being inspected.

VArious other features and advantages of the invention will become apparent upon reading the following specification which describes illustrative embodiments of the invention. The specification is to be taken with the accompanying drawings of which:

Figure 1:
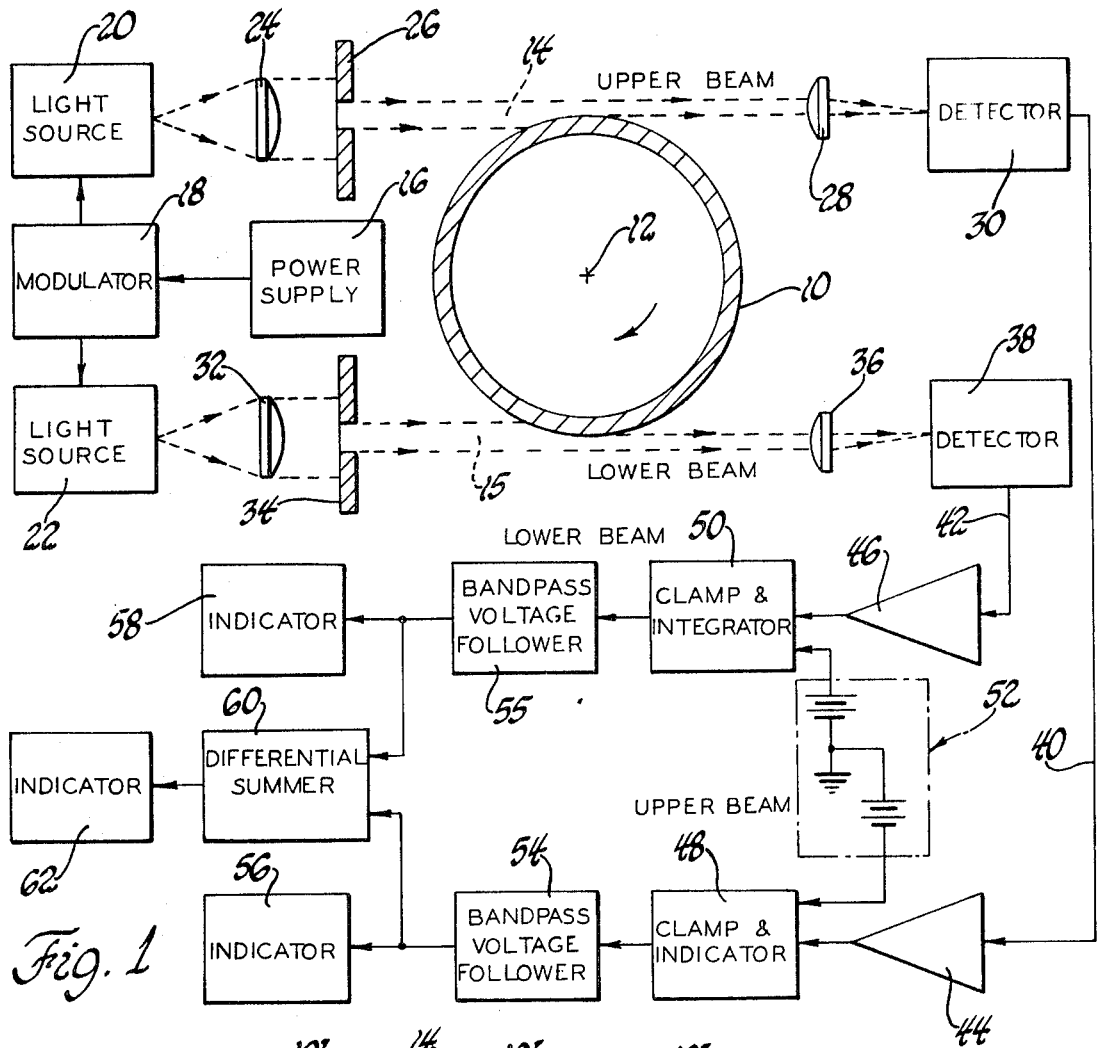
FIG. 1 is a block diagram of an illustrative embodiment of the invention.

Referring to FIG. 1, the illustrated embodiment of the invention is employed to inspect and analyze the dimensional characteristics of an object 10 having a generally circular cross section and mounted for rotation about an axis 12. The object 10 may be a shaft, tool, or workpiece and may be tubular in nature, as shown, or solid without affecting the operation of the embodiment in any way. The object 10 is inspected by means of highly collimated beams of light 14 and 15 hereinafter described as the upper and lower beams, respectively, which are directed tangentially along diametrically opposite surface portions of the object 10 so as to be partially intercepted thereby.

The beams 14 and 15 are produced by means of power supply 16 which is connected to a high-frequency pulse modulator 18 which may, for example, operate at a frequency of 10 kilocycles. The frequency is chosen to eliminate background radiation and is preferably higher than the angular frequency of object 10 by order of magnitude. The modulator 18 is connected to a pair of light sources 20 and 22, such as emitting diodes. The output source 20 is directed through a lens 24 which collimates the light output and a mask 26 having an aperture therein to permit passage of only the highly uniform central portion of the beam which is produced by lens 24. The beam 14 is projected tangentially past the object 10 such that a portion of the beam is intercepted by the part. The unintercepted portion is projected through a focusing lens 28 toward a light-energy-responsive detector 30 which produces an electrical signal corresponding to the quantity of light energy which is incident thereon.

Similarly, the light output of source 22 is directed through a collimating lens 32 and a mask 34 to form beam 15. The beam 15 is projected past the object 10 at a point which is diametrically opposite the beam 14 such that a portion of the beam 15 is intercepted by the object 10. The unintercepted portion of beam 15 is directed through a focusing lens 36 to the input of a detector 38. This detector also functions to produce an electrical signal representing the quantity of radiant energy which is incident thereon. Detectors 30 and 38 may also be light-sensitive diodes, photocells, photomultipliers, or other light responsive electrooptical devices. The electrical signals which are produced by the detectors 30 and 38 exhibit a frequency corresponding to that of the modulator 18 and vary in amplitude in accordance with the position and displacement of the surface portions which instantaneously intercept the beams 14 and 15. Obviously, a single source and a beam splitter may be used to produce the two beams 14 and 15.

The detectors 30 and 38 are connected into upper and lower beam processing channels 40 and 42, respectively. Channel 40 comprises a stable amplifier 44, a clamping and integrating circuit 48 which averages out the modulated pulses, a high impedance voltage follower circuit 54, and an indicator 56 such as a strip chart recorder. The lower beam signal processing channel 42 similarly comprises a stable amplifier 46, a clamping and integrating circuit 50, a high impedance band pass voltage follower circuit 56, and an indicator 58, such as a strip chart recorder. For purposes to be described, a double-polarity voltage reference source 52 has the negative voltage terminal thereof connected to the clamping and integrating circuit 50 and the positive voltage terminal thereof connected to the clamping and integrating circuit 48. Accordingly, the amplitude of the signal produced by the circuit 48 in the upper beam signal processing channel 40 varies with reference to a positive voltage reference while the amplitude of the signal produced by circuit 56 in the lower beam signal beam processing channel 42 varies with reference to a negative voltage reference. Finally, the outputs of the circuits 54 and 56 are connected to respective inputs of a differential summer circuit 60 which produces an output which varies in accordance with the difference between the output of circuit 54 and the inverted output of circuit 55. This output is applied to a third indicator 62 such as a strip chart recorder. The summer circuit 60 thus operates as a comparator means to compare the upper beam signal to the lower beam signal within a predetermined algebraic framework.

It will be understood that while strip chart recorders are suitable devices for use where specified by the reference numerals 56, 58, and 62 in FIG. 1, various other indicating or recording devices of either of an analogue or digital character may also be employed.

Figure 2:
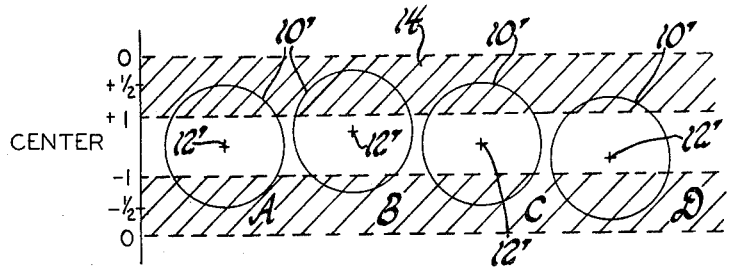
FIG. 2 is a diagram of typical part movements which can be detected with the use of the apparatus shown in FIG. 1.
Figure 4:
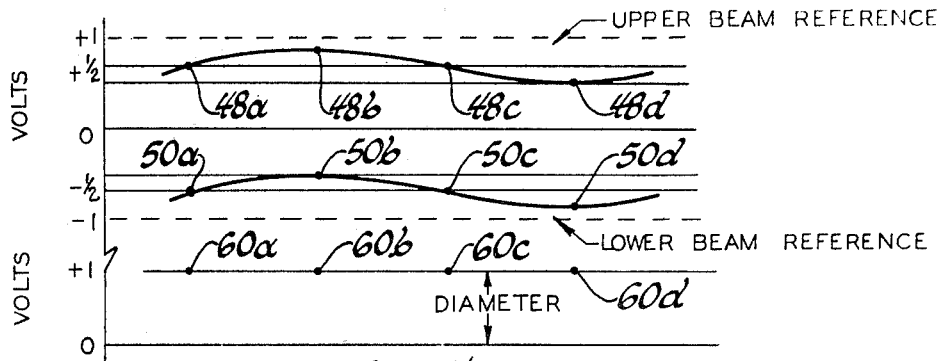
FIG. 4 is a waveform diagram representing the information developed by the embodiment of FIG. 1 under conditions illustrated in FIG. 2.

Referring now to FIGS. 2 and 4, the operation of the embodiment of FIG. 1 will be described under a first set of circumstances. FIG. 2 shows a perfectly round object 10' having a geometric center 12' in four positions relative to the upper and lower beams 14 and 15, respectively. The four positions are identified by the letters A, B, C, and D and may be taken to represent the object 10' in four angular orientations, each of which is spaced from the preceding orientation by 90° or one quarter of a revolution.

In FIG. 2A, the object 10' is disposed such that the geometric center 12' is centered between the upper and lower beams 14 and 15, respectively, such that the object intercepts one-half of each of the beams. In each beam, total interception by the object 10' is represented by a "zero" value and no interception of the beam by the object 10' is represented by the value "one." Under the conditions illustrated in FIG. 2A, the output of circuit 48 in the upper beam channel 40 is represented by a point 48A in FIG. 4 which corresponds to one-half of the total upper beam reference quantity as indicated. Similarly, the output of the circuit 50 in the lower beam channel 42 is represented by a point 50A. By suitable location of the sources 20 and 22 and the masks 26 and 34 in FIG. 1, the values represented by the points 48A and 50A may be established as preferred values; that is, the values which obtain when the object 10' is properly located relative to the beams 14 and 15 is of the proper diameter and has the geometric center 12' in correspondence with the center of rotation. Accordingly, the output of the differential summer circuit 60 represented in FIG. 4 by the point 60A corresponds to a predetermined reference value of "one." As previously indicated, this value obtained by inverting the signal quantity produced on the output circuit 55 and measuring the difference between this inverted quantity and the value of the signal quantity on the output of circuit 54.

In FIG. 2B, the object 10' is rotated through 90° or one-quarter of a revolution. The object 10' is found to be eccentric such that the geometric center 12' no longer corresponds to the center of rotation but describes a circle around the center of rotation. Accordingly, the object 10' is displaced upwardly relative to both of the beams 14 and 15 as shown in FIG. 2. This tends to intercept more of the beam 14 and less of the beam 15 such that a lower amplitude signal is produced by detector 30 and a higher amplitude signal is produced by detector 38. Since the upper beam signal is referenced to a positive quantity established by the source 52 the upper beam output signal from circuit 48 increases to a value represented by point 48B. Similarly, since the lower beam signal quantity from circuit 50 is reference to the negative voltage established by source 52 the lower beam signal also increases absolutely as represented by the point 50B. Since the diameter of the object 10' has not changed due to the angular rotation and measured relative to the beams 14 and 15, the absolute difference between the point 48B and 50B does not change. Accordingly, the output of differential summer circuit 60 remains constant at the reference value "one" as shown by the point 60B in FIG. 4.

In FIG. 2C, the part is rotated through another angular increment of 90° which returns the geometric center to a position which is centrally located with respect to the upper and lower beams. Accordingly, the output signal values from the circuits 48 and 50 return to the reference value of one-half as represented by points 48C and 40C, respectively. Again, the measure diameter of the object 10' has not changed and, accordingly, the differential output summer 60 is constant at the reference value of "one" as represented by point 60C.

After the object 10' is rotated through an additional one-quarter revolution, the geometric center 12' is displaced downwardly relative to the upper and lower beams as shown in FIG. 2D. This tends to decrease the output of the upper beam clamping and integrating circuit 48 as shown by point 48D and to algebraically decrease the output of the negatively referenced clamping and integrating circuit 50 as shown by the point 50D. However, since the measured diameter of the object 10' has not changed, the output of the differential summing circuit 60 remains constant at the reference value of "one" as indicated by point 60D of FIG. 4.

Examination of FIG. 4 indicates that the in-Phase time varying character of the curves drawn through the points defined by the reference characters 48 and 50 represents an eccentricity in the object 10' under inspection. The constant character of the curve drawn through the points defined by the reference characters 60 indicates that the diameter of the object 10' is constant. Accordingly, the sum total of information available from the curves of FIG. 4, indicates a displacement between the center of rotation of the object 10' and the geometric center of the object, which displacement is approximately one-quarter of a unit, and also that the diameter of the object 10' is unchanging.

Figure 3:
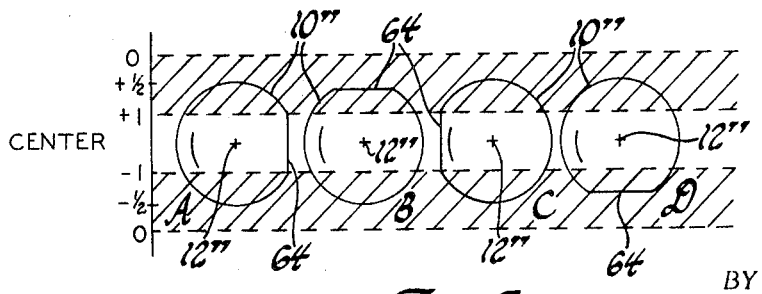
FIG. 3 is a diagram of typical surface irregularities which can be detected using the apparatus of FIG. 1.
Figure 5:
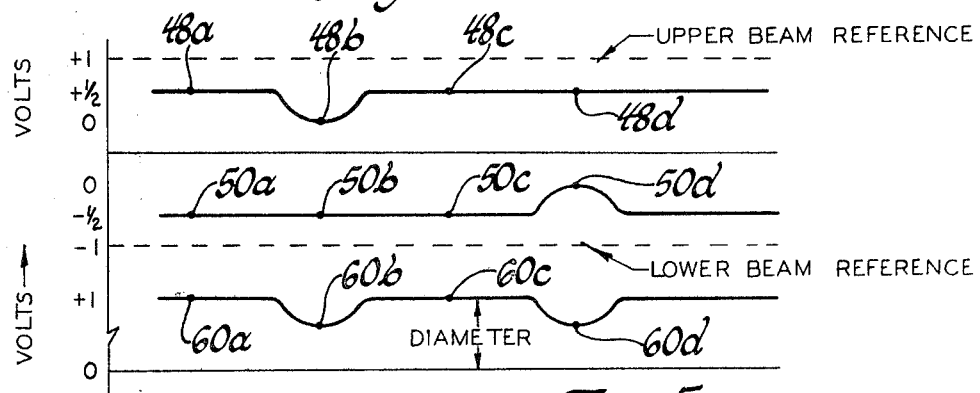
FIG. 5 is a waveform diagram indicating the information available from the embodiment of FIG. 1 under conditions illustrated in FIG. 3; and, FIG. 6 is a schematic diagram of an alternative arrangement of radiant energy beams which may be used to inspect small diameter parts.

Reference to FIGS. 3 and 5 indicates the character of the information which is available form the apparatus of FIG. 1 under a different set of circumstances; to wit, an object 10" having a geometric center 12" which is constantly centered between the beams 14 and 15 irrespective of the angular position of the object exhibits a surface irregularity in the form a circumferential flat 64. As shown in FIG. 3A, when the circumferential flat 64 is oriented with the surface plane at right angles to the direction of the beams 14 and 15 the object 10" intercepts equal portions of the upper and lower beam 14 and 15, respectively. Moreover, these portions are selected at reference values of one-half of the projected area of the original beams. Looking to FIG. 5, the output voltages from the clamping and integrating circuits 48 and 50 are of the reference amplitude of "one-half" as indicated by the points 48A and 50A, respectively. In addition, the output of the differential summing circuit 60 is at the amplitude of "one" indicating that the object 10" is of the proper diameter when measured at the orientation of FIG. 3A.

In FIG. 3B, the object 10" is rotated clockwise through one-quarter of a revolution such that the circumferential flat 64 is disposed fully within and parallel to the upper beam 14. Under these conditions, the intercepted portion of the lower beam 15 remains constant but the intercepted portion of the upper beam 14 decreases. Accordingly, the output of the clamping and integrating circuit 48 representing the upper beam signal algebraically decreases as indicated by point 48B in FIG. 5 and the output of the lower beam clamping and integrating circuit 50 remains constant as indicated by point 50B of FIG. 5. The output of the differential summer decreases to "three-quarters" to indicate the surface irregularity formed by the circumferential flat 64 as indicated by point 60B of FIG. 5.

After the object 10″ has rotated an additional 90° or one-quarter of a revolution, the circumferential flat 64 is again disposed at right angles to each of the beams 14 and 15. Accordingly, the outputs of the circuit components of FIG. 1 return to the reference values as indicated by the points 48C, 50C, and 60C of FIG. 5.

After the object 10″ has rotated in the counterclockwise direction by an additional one-quarter of a revolution, the circumferential flat 64 is disposed fully within and parallel to the lower beam 15. Accordingly, the upper beam signal remains unchanged as indicated by point 48D, but the lower beam signal algebraically increases as indicated by the point 50D in FIG. 5. AT the same time, the output of the differential summer 60 decreases from the reference value of "one" as indicated by the point 60D of FIG. 5.

Reviewing FIG. 5, it can be seen that the curves drawn through the points 48 and 50 are of opposite polarity and 180° out of phase. This indicates the presence of a surface irregularity. Since the curves do not vary in phase as was the case described with reference to FIG. 4, it can be assumed that the geometric center 12″ of the object 10″ corresponds with the center of rotation and no eccentricity or wobble is present. The output of the differential summer 60 represented by the curve drawn through points 60 of FIG. 5 also confirms the presence of a surface irregularity which varies the measured diameter of the part at a frequency of twice the rotational frequency of the object 10″.

Figure 6:
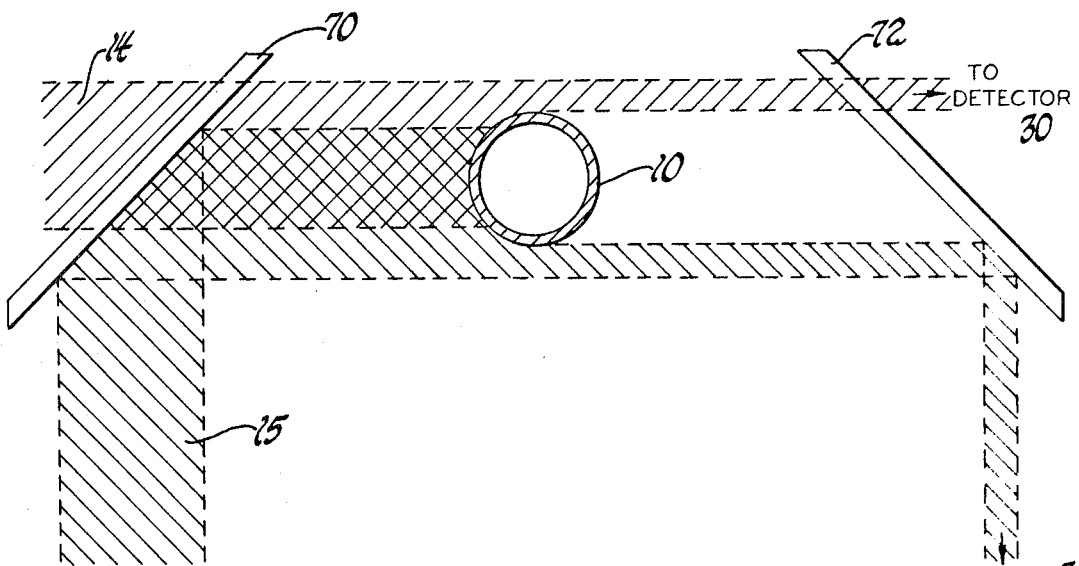

Referring now to FIG. 6, a modified embodiment of the invention is shown to permit the inspection of an object 10 of extremely small diameter. In FIG. 6, beam-splitting reflectors 70 and 72 are employed to effectively overlap the beams 14 and 15 and to permit the light sources 20 and 22 of FIG. 1 to be disposed in such a way that the original light beams are nonparallel. In FIG. 6, the upper beam 14 is directed through the beam splitter 70 so as to be projected tangentially along the upper surface of the object 10. The unintercepted portion of the beam 14 passes through the beam splitter 70 en route to the detector 30 and through apparatus as described with reference to FIG. 1. However, the lower beam 15 is projected at right angles to the beam 14 toward the beam splitter 70 which reflects the beam 15 and turns it through an angle of 90°. The beam 15 is thereby directed tangentially along the lower surface of the object 10. The unintercepted portion of the beam 15 is again reflected through an angle of 90° by the beam splitter 72 en route to the detector 38 and the other apparatus shown in FIG. 1. As suggested in FIG. 6, the beams 14 and 15 are overlapped by an amount which is less than the external diameter of the object 10' so that no beam interference is produced. It is understood that the embodiment of FIG. 6 otherwise incorporates all of the apparatus shown and described with reference to FIG. 1.

It is to be understood that the foregoing descriptions relate to illustrate embodiments and is not to be construed in a limiting sense.

The embodiments of the invention in which an exclusive property or privilege is claimed are defined as follows:

1. Apparatus for determining the geometric qualities of a rotating object by monitoring the radial displacements of first and second diametrically opposite surface locations comprising: an object rotating at a given angular frequency, means for rotating said object, source means for producing first and second parallel and substantially collimated beams of radiant energy having respective reference boundaries which are fixed in space, said source means including pulsed excitation means such that the beams are intermittent in character at a high repetition rate, means for directing the beams tangentially along the respective surface locations such that each beam is partially intercepted by the object to a degree related to the radial position of the surface location intercepting the beam relative to the reference boundary of the beam, first and second detector means for receiving the unintercepted portion of the first and second beams, respectively, and for producing first and second signals relating substantially proportionally to the distances between the surface locations intercepting the beams and the reference boundaries, and output means including circuit means for smoothing the intermittent pulses received for the beams and being connected to the detector means for comparing the relative values of the first and second signals.

2. Apparatus as defined in claim 1 wherein the output means comprises means for referring the detector signals individually to opposite polarity reference values and comparator means in the form of a differential summer for producing an output related to the algebraic difference between the first and second signals.

3. Apparatus as defined in claim 1 wherein the output means further comprises first and second indicator means for indicating the values of the first and second signals relative to first and second algebraically opposite reference values.

4. Apparatus as defined in claim 1 wherein the first and second beams are spaced apart.

5. Apparatus as defined in claim 1 wherein the boundaries of the first and second beams opposite the reference boundaries overlap one another by a distance less than the diameter of the object.

6. Apparatus as defined in claim 1 wherein the means for producing the beams includes at least one diode light source.

7. Apparatus as defined in claim 6 wherein the means for pulse modulating the light source includes a current source which pulsates at a frequency which is substantially higher than the angular frequency of the object.

8. Apparatus as defined in claim 2 wherein the first and second beams are of a predetermined width radially of the object and the output means includes bias means for establishing first and second algebraically opposite reference values for the first and second signals, respectively.

9. Apparatus as defined in claim 8 wherein the means for directing the beams is adjusted such that an object of preferred diametric dimension produces an output from said comparator means of a first reference value.

10. Apparatus as defined in claim 9 wherein the object is normally centered between the beams.